United States Patent [19]

Story et al.

[11] Patent Number: 5,332,433
[45] Date of Patent: Jul. 26, 1994

[54] TITANIUM DIOXIDE DISPERSIBILITY

[75] Inventors: Phillip Story, Yukon; Kelly A. Green, Edmond; John E. Halko, Okarche, all of Okla.

[73] Assignee: Kerr-McGee Chemical Corporation, Oklahoma City, Okla.

[21] Appl. No.: 156,743

[22] Filed: Nov. 24, 1993

[51] Int. Cl.$^5$ .............................................. C09C 1/36
[52] U.S. Cl. ................................... 106/442; 106/449; 106/437; 423/610
[58] Field of Search ............... 106/442, 449, 437; 423/598, 610, 612, 616; 524/1, 497

[56] References Cited

U.S. PATENT DOCUMENTS

| | | | |
|---|---|---|---|
| Re. 34,145 | 12/1992 | Martin | 523/205 |
| 3,208,866 | 9/1965 | Lewis et al. | 106/300 |
| 3,511,618 | 5/1970 | Michaud et al. | 106/442 X |
| 3,512,219 | 5/1970 | Stern et al. | 23/277 |
| 3,582,275 | 6/1971 | Sugahara et al. | 23/202 |
| 3,770,470 | 11/1973 | Swank | 106/442 X |
| 3,929,962 | 12/1975 | Shiah | 423/82 |
| 4,022,636 | 5/1977 | Murray | 106/442 |
| 4,107,264 | 8/1978 | Nagasubramanian et al. | 423/81 |
| 4,448,609 | 5/1984 | Tear et al. | 106/442 X |
| 4,505,886 | 3/1985 | Cody et al. | 423/616 |
| 4,759,916 | 7/1988 | Heikel | 423/71 |
| 4,863,711 | 9/1989 | Heikel | 423/610 |
| 4,915,930 | 4/1990 | Goheen et al. | 423/629 |
| 5,011,674 | 4/1991 | Yoshimoto et al. | 423/610 |
| 5,030,439 | 7/1991 | Brownbridge | 423/610 |
| 5,094,834 | 3/1992 | Wiederhoft et al. | 423/616 |
| 5,169,619 | 12/1992 | Yoshimoto et al. | 423/610 |
| 5,176,905 | 1/1993 | Ohno et al. | 424/69 |
| 5,227,421 | 7/1993 | Kageyama et al. | 524/449 |

FOREIGN PATENT DOCUMENTS

0444798A2 9/1991 European Pat. Off.
0444798A3 9/1991 European Pat. Off.

Primary Examiner—Karl Group
Assistant Examiner—Chris Gallo
Attorney, Agent, or Firm—Herbert M. Hanegan

[57] ABSTRACT

A titanium dioxide production method, a novel titanium dioxide product produced by the inventive titanium dioxide production method, a method for producing a plastic product using the novel titanium dioxide product, and a novel plastic product formed by the inventive plastic product production method. The inventive titanium dioxide production method comprises the steps of: (a) forming a mixture comprising a titanium dioxide material in a liquid medium; (b) wet milling the titanium dioxide material in the liquid medium; (c) after step (b), reducing the pH of the mixture to a value not exceeding 4.0; (d) after step (c), adding an effective amount of a base to the mixture to cause the titanium dioxide material to flocculate; (e) removing the flocculated titanium dioxide material from the mixture; and (f) washing the titanium dioxide material. The titanium dioxide material used in step (a) is an agglomerated titanium dioxide material which has been produced by a reaction process. Other than any inorganic oxides formed in the reaction process along with the titanium dioxide material, the titanium dioxide material used in step (a) has substantially no inorganic oxides deposited thereon. Additionally, other than any redeposited inorganic oxides originally produced in the reaction process along with the titanium dioxide material, substantially no inorganic oxides are deposited on the titanium dioxide material during the course of the inventive titanium dioxide production method.

27 Claims, No Drawings

TITANIUM DIOXIDE DISPERSIBILITY

FIELD OF THE INVENTION

In one aspect, the present invention relates to methods of producing titanium dioxide and to titanium dioxide products produced by such methods. In another aspect, the present invention relates to processes for producing plastic products containing titanium dioxide and to plastic products formed by such processes.

BACKGROUND OF THE INVENTION

Pigmentary titanium dioxide materials are widely used as coloring agents in plastics, paints, inks, papers, and in many other materials. In plastics, pigmentary titanium dioxides impart color and provide UV protection. The UV protection provided by the incorporation of titanium dioxide can substantially improve the durability of a plastic material.

A need presently exists for titanium dioxide materials which are more readily dispersed in plastics. In order to reduce the weight and cost of plastic film products, for example, the plastics industry is seeking ways to reduce the thickness of plastic film products while maintaining the strength and integrity of such products. The dispersibility of the pigmentary materials used in such applications becomes more significant as film thickness decreases. When a titanium dioxide pigment is inadequately dispersed in a plastic film product, the presence of agglomerated masses of undispersed pigment material (i.e., nibs) can destroy the utility of the plastic film. Additionally, undispersed pigment material can stick to process rollers and/or die parts and thereby produce holes, rips, and/or tears in the plastic film product. Further, poorly dispersed pigment materials can quickly clog polishing screens and other such devices used in film forming processes.

Titanium dioxides are generally produced in two crystalline forms, anatase and rutile. Rutile titanium dioxide is commonly produced from titanium halides (preferably titanium tetrachloride) using vapor phase oxidation processes. Examples of vapor phase oxidation processes are disclosed in U.S. Pat. Nos. 3,208,866 and 3,512,219. The entire disclosures of these patents are incorporated herein by reference.

In a vapor phase oxidation process, a titanium halide vapor reactant is oxidized using an oxygen-containing gas such as molecular oxygen, air, or oxygen enriched air. Various particle size control agents and/or rutilization agents are commonly added to the vapor phase oxidation system. Water vapor is commonly added, for example, to control nucleation and, therefore, product particle size. Aluminum chloride is commonly added in order to stabilize the crystalline matrix of the titanium dioxide product material and promote rutilization.

The aluminum chloride added to the vapor phase oxidation system is oxidized in the system to form alumina. Generally, the amount of aluminum chloride added to the oxidation system will be an amount sufficient to yield an alumina concentration in the oxidation system product in the range of from about 0.05 parts to about 10 parts by weight per 100 parts by weight of titanium dioxide contained in the reaction system product.

The reactants employed in a vapor phase oxidation process are typically preheated prior to being combined in the reaction chamber. Additional heat is preferably provided in the reaction chamber by (a) introducing a combustible gas (e.g., carbon monoxide, benzene, naphthalene, acetylene, anthracene, or the like) directly to the reaction chamber and/or (b) adding such combustible gas to one or more of the reactant streams. Combustible gas will preferably be added to the supply conduit for the oxidizing gas such that the combustible gas is burned (a) in the oxidizing gas supply conduit immediately before entering the reaction chamber and/or (b) in the region of the reaction chamber wherein the reactants are mixed.

The amount of oxidizing gas employed in the vapor phase oxidation process will preferably be an amount in excess of the stoichiometric amount required for the combustion of the combustible material, for the oxidation of the titanium halide reactant, and for the oxidation of any other oxidizable additives used in the vapor phase oxidation process.

The reaction effluent from the vapor phase oxidation system is preferably cooled immediately upon leaving the reaction chamber. Such cooling is commonly accomplished, for example, by mixing a cool gas (e.g., cooled chlorine effluent obtained from the reaction process) with the reaction effluent stream or by contacting the reaction effluent stream with water.

The titanium dioxide product produced in the vapor phase oxidation process is a solid, agglomerated particulate material. Typically, the particulate titanium dioxide product is recovered from the reaction effluent using cyclones, bag filters, settling chambers, or a combination thereof.

Heretofore, the crude, agglomerated titanium dioxide material recovered from the vapor phase oxidation system effluent has typically been processed by (1) dispersing the crude material in an aqueous medium using a dispersing agent (e.g., a polyphosphate); (2) thoroughly wet milling the material; (3) precipitating inorganic oxides (e.g., alumina and/or silica) onto the particle surfaces of the wet milled titanium dioxide material; (4) recovering the alumina and/or silica treated titanium dioxide material from the aqueous medium by filtering; (5) washing and filtering the recovered product to remove salts and impurities therefrom; (6) drying the washed product; and (7) grinding the dried product to a desired size using, e.g., a fluid energy mill.

The inorganic oxides (e.g., alumina and/or silica) deposited on the wet milled titanium dioxide material change the surface properties of the particulate material so that the material will flocculate. The flocculation of the particulate material allows the material to be recovered and washed using conventional vacuum-type and/or pressure-type filtration systems.

Unfortunately, the presence of added inorganic oxides on the surfaces of the processed titanium dioxide material reduces the dispersibility of the material in plastics. Generally, this result occurs because (1) the deposited inorganic oxides increase the surface area of the particulate material and (2) the deposited inorganic oxides are generally hydrophilic. In contrast to the deposited inorganic oxides, plastics are generally hydrophobic.

If such inorganic oxides are not deposited on the particulate material, it has heretofore been necessary to add polymeric flocculants and/or flocculating salts (e.g., magnesium sulfate) to the wet milled titanium dioxide dispersion in order to allow the milled material to be collected and recovered using conventional vacuum-type and/or pressure-type filtration systems. Unfortunately, such flocculating agents add undesirable impurities to the system and detract from the properties of the processed titanium dioxide product.

SUMMARY OF THE INVENTION

The present invention provides a titanium dioxide processing method wherein product recovery, washing, and filtration are accomplished without the deposition of additional inorganic oxides and without the addition of polymeric flocculants and/or flocculating salts such as magnesium sulfate. The inventive processing method thus provides a novel titanium dioxide product which is more readily dispersible in plastics.

The inventive titanium dioxide processing method comprises the steps of: (a) forming a mixture comprising an agglomerated titanium dioxide material in a liquid medium; (b) wet milling the agglomerated titanium dioxide material in the liquid medium; (c) after step (b), reducing the pH of the mixture to a value not exceeding 4.0; (d) after step (c), adding an effective amount of a base to the mixture to cause the titanium dioxide material to flocculate; (e) after step (d), removing the titanium dioxide material from the mixture; and (f) after step (d), washing the titanium dioxide material. The agglomerated titanium dioxide material used in step (a) is a material which has been produced by a reaction process. Other than any inorganic oxides formed in the reaction process along with the titanium dioxide material, the titanium dioxide material used in step (a) has substantially no inorganic oxides deposited thereon. Additionally, other than any redeposited inorganic oxides originally formed in the reaction process along with the titanium dioxide, substantially no inorganic oxides are deposited on the titanium dioxide material during the course of the inventive titanium dioxide processing method.

The present invention also provides a novel process for producing a plastic product. This process comprises the step of dispersing a titanium dioxide product in a plastic material to form a plastic composition. The titanium dioxide product used in this inventive process is the novel titanium dioxide product produced by the inventive titanium dioxide processing method. In one embodiment, the inventive process for producing a plastic product further comprises the step of forming a plastic sheet using the plastic composition.

Further objects, features, and advantages of the present invention will be readily apparent to those skilled in the art upon reading the following description of the preferred embodiments.

DESCRIPTION OF THE PREFERRED EMBODIMENTS

As indicated hereinabove, the present invention provides an improved titanium dioxide processing method. The present invention also provides a novel titanium dioxide material which is produced by the inventive processing method. The novel titanium dioxide material exhibits improved dispersibility in plastics.

The inventive titanium dioxide processing method preferably comprises the steps of: (1) dispersing a crude, agglomerated titanium dioxide material in an aqueous medium; (2) wet milling the agglomerated titanium dioxide material; (3) reducing the pH of the resulting milled titanium dioxide dispersion; (4) allowing the resulting acidic dispersion to digest; (5) increasing the pH of the dispersion sufficiently to cause the milled titanium dioxide material to flocculate; (6) recovering the milled titanium dioxide material from the aqueous dispersion; (7) washing the recovered titanium dioxide material to remove salts and impurities therefrom; (8) drying the washed product; and (9) grinding the dry titanium dioxide product to obtain a desired particle size distribution. In contrast to the titanium dioxide processing methods used heretofore, the inventive method utilizes neither the deposition of additional inorganic oxides (e.g., alumina and/or silica) nor the addition of polymeric flocculants and/or flocculating salts.

Generally any type of agglomerated titanium dioxide material can be processed in accordance with the inventive method. However, the agglomerated titanium dioxide material processed in accordance with the inventive method is preferably a rutile titanium dioxide material which has been formed from titanium tetrachloride using a vapor phase oxidation process of the type described hereinabove.

The agglomerated titanium dioxide material processed in accordance with the inventive method is also preferably a pigmentary titanium dioxide material. Pigmentary titanium dioxide materials are characterized by crystal sizes in the range of from about 0.1 to about 0.5 micron. The agglomerated pigmentary titanium dioxide material will preferably have a crystal size of about 0.2 micron.

As explained hereinbelow, the agglomerated titanium dioxide material processed in accordance with the inventive method also preferably contains an amount of alumina which was formed along with the titanium dioxide material in the vapor phase oxidation system. As discussed above, alumina is typically produced along with titanium dioxide in a vapor phase oxidation system by adding an oxidizable aluminum material (preferably aluminum chloride) to the oxidation system. Agglomerated titanium dioxide materials processed in accordance with the inventive method will typically be comprised of from about 0.05 to about 10 parts by weight of coproduced alumina per 100 parts by weight of titanium dioxide. The agglomerated titanium dioxide material will preferably be comprised of from about 0.25 to about 3 parts by weight of alumina per 100 parts by weight of titanium dioxide.

Other than said coproduced alumina and any other inorganic oxides formed in the vapor phase oxidation process along with the titanium dioxide, the agglomerated titanium dioxide material processed in accordance with the inventive method will preferably be a material having no inorganic oxides (e.g., alumina and/or silica) deposited thereon.

The agglomerated titanium dioxide material is preferably prepared for wet milling by dispersing the material in an aqueous medium. As will be understood by those skilled in the art, various dispersing agents (e.g., polyphosphates) can be used to promote the dispersion of the particulate material in the aqueous medium. The dispersion will preferably have a solids concentration in the range of from about 5 to about 50% by weight based on the total weight of the dispersion. The dispersion will most preferably have a solids concentration of about 30% by weight based on the total weight of the dispersion.

The system used in the wet milling step of the inventive method can be a disk-type agitator, a cage-type agitator, or generally any other type of wet milling system commonly used in the art. The milling media employed can be sand, glass beads, alumina beads, or generally any other commonly used milling media. The individual grains, particles, or beads of the milling media will preferably be more dense than the aqueous media used in forming the titanium dioxide dispersion.

In comparison to the wet milling steps used in other titanium dioxide processing methods, a much less severe degree of wet milling is employed in the inventive method. In the inventive method, the dispersed titanium dioxide material is wet milled such that (a) substantially all of the titanium dioxide material passes 15 micron and (b) at least 30% by weight, but no more than 70% by weight, of the titanium dioxide material has a particle size smaller than 0.5 micron.

The reduced severity of the wet milling step of the inventive method is attained by substantially reducing the amount of milling media employed and/or substantially reducing the duration of the wet milling step. For a given wet milling system, a particle size analyzer (e.g., a MICROTRAC analyzer or a SEDIGRAPH analyzer) can at least initially be used to monitor the particle size of the dispersed titanium dioxide material and thereby establish suitable and optimum milling media concentrations and wet milling times. If a sand milling process is used, the amount of sand employed in the inventive method will typically be an amount in the range of from about 10 to about 100 parts by weight per 100 parts by weight of particulate titanium dioxide material. The milling time employed in the inventive method will typically be in the range of from about 0.5 to about 4 minutes.

During the wet milling step, the temperature of the titanium dioxide dispersion will preferably be at least about 90° F. The temperature of the titanium dioxide dispersion during the wet milling step will most preferably be in the range of from about 120° F. to about 160° F. At the end of the wet milling procedure, the milling media is preferably removed from the titanium dioxide dispersion using a suitably sized (typically 100 mesh) screen.

Following the wet milling step, an effective amount of an acid is added to the titanium dioxide dispersion to reduce the pH of the dispersion to a value not exceeding 4.0. The pH of the titanium dioxide dispersion is preferably reduced to a value not exceeding 3.0. The pH of the dispersion is most preferably reduced to a value of about 2.0.

In order to facilitate the mixing of the acid with the dispersion medium, the dispersion is preferably maintained at a temperature in the range of from about 120° F. to about 180° F. during the acidification step. Preferably, the dispersion is maintained at a temperature in the range of from about 150° F. to about 170° F. during the acidification step.

The acid used in the acidification step will preferably be a strong acid such as sulfuric acid, hydrochloric acid, and/or nitric acid. Sulfuric acid operates to promote titanium dioxide flocculation and is therefore the acid preferred for use in the pH reduction step.

In the next step of the inventive method, the acidic titanium dioxide dispersion is allowed to digest. During the digestion stage, the pH of the dispersion will typically increase slightly. The acidic dispersion will preferably be allowed to digest until the pH of the dispersion stabilizes. Thus, the duration of the digestion period will typically be in the range of from about 10 minutes to about 1 hour.

Following the digestion step, the pH of the titanium dioxide dispersion is increased sufficiently to cause the titanium dioxide material to flocculate. Preferably, a sufficient amount of a base is added to the dispersion during this step to increase the pH of the dispersion to a value in the range of from about 5 to about 8. Most preferably, the pH of the dispersion is increased during this step to a value of about 7. During this stage of the inventive method, the dispersion is preferably maintained at a temperature in the range of from about 120° F. to about 180° F. and is most preferably maintained at a temperature in the range of from about 150° F. to about 170° F.

Examples of bases suitable for use in the inventive method include the hydroxides of the elements of Group I of the Periodic Table. The base used in this step of the inventive method is most preferably sodium hydroxide, potassium hydroxide, or a combination thereof.

The recovery and washing steps of the inventive method can be conducted using a vacuum-type filtration system, a pressure-type filtration system, or generally any other type of filtration system used in the art. The recovery and washing steps of the inventive method are preferably conducted using a rotary vacuum-type filter.

The neutralized titanium dioxide dispersion is placed in the feed trough of the vacuum-type filter whereby the dispersion media is separated from flocculated titanium dioxide material. Fresh deionized water is then added to the system in order to wash the titanium dioxide filtrate. After one or more such washing steps, the filter cake can optionally be removed from the filter system, repulped in a pulping device, placed in fresh water, and then returned to the filter system for additional washing.

Following the washing step, the titanium dioxide product material can be dried using generally any type of drying system commonly used in the art. Examples include tunnel driers, spray drying systems, spin flash driers, and combinations thereof. The dry product thus produced can be ground to a desired final particle size distribution using, for example, a fluid energy mill.

The flocculation of the titanium dioxide material during the inventive processing method occurs, in part, as a result of the dissolution and reprecipitation of at least a portion of the coproduced alumina contained in the crude titanium dioxide material. Normally, from about one-half to about two-thirds of the coproduced alumina contained in a crude, agglomerated titanium dioxide material will be present on the surface of the material. As the pH of the titanium dioxide dispersion is reduced in accordance with the pH reduction step of the inventive method, at least some of the surface alumina apparently dissolves in the acidic aqueous dispersion media. When the media is then neutralized, the particulate titanium dioxide material has a surface charge of substantially zero and therefore tends to flocculate. Additionally, the dissolved alumina reprecipitates and thereby strengthens the flocculates and improves filtration.

The reduced severity of the milling step used in the inventive method also facilitates the flocculation of the titanium dioxide material. In the wet milling step of the inventive method, the crude, agglomerated titanium dioxide material is lightly milled such that a sufficient degree of flocculate structure is maintained in the material to promote the flocculation of the treated product.

As indicated above, the present invention also includes (a) a process for producing a plastic product and (b) a novel plastic product produced thereby. The inventive process comprises the step of dispersing the novel titanium dioxide material in plastic.

The novel titanium dioxide material can be dispersed in generally any type of plastic material (e.g., polyethylene) used for producing plastic films and other articles. The dispersion of the novel product in a given plastic material can be accomplished, for example, using a BANBURY-type mixer, a HENSHEL-type mixer, and/or a continuous extruding device such as a twin screw extruder.

In one embodiment of the inventive process, the plastic composition produced by dispersing the inventive titanium dioxide material in plastic is formed to provide a thin plastic film material. The thin plastic film material can be formed, for example, using an extrusion blowing process, a calendering process, or generally any other film forming process used in the art. Prior to forming the thin plastic film, the plastic composition can be extruded through a polishing screen.

The following example is provided in order to further illustrate the present invention.

EXAMPLE

A dry, agglomerated titanium dioxide sample obtained from the vapor phase oxidation of titanium tetrachloride was dispersed in water at a solids concentration of 30% by weight. A polysulfate dispersion agent was used along with a sufficient amount of sodium hydroxide to adjust the pH of the dispersion to a value of 9.5.

One-half of the dispersed sample was sand milled for 8 minutes at a sand-to-pigment weight ratio of 2.8 to 1. The other half of the dispersion material was sand milled for 2 minutes at a sand-to-pigment weight ratio of 0.28 to 1. In each case, the sand was removed by screening through a 100 mesh screen.

The heavily milled sample was acidified to a pH of 2.0 using sulfuric acid. After acidification, the heavily milled sample was allowed to digest for 30 minutes. A sodium aluminate solution was then added to the heavily milled dispersion in an amount sufficient to precipitate alumina on the dispersed pigment in an amount of 0.4 parts by weight per 100 parts by weight of dispersed pigment material. The pH of the heavily milled dispersion was then adjusted to a value of 6.5 using sodium hydroxide and an additional 0.2 parts by weight of alumina per 100 parts by weight of particulate pigment material was deposited on the pigment material.

In contrast to the heavily milled sample, the lightly milled sample was acidified to a pH of 2.0 and then allowed to digest for 30 minutes at 140° F. The pH of the lightly milled dispersion was then raised to a value of 7.0 using sodium hydroxide.

Both the heavily milled sample and the lightly milled sample were then filtered and washed with water at a 2 to 1 water-to-pigment ratio. The filter cakes thus obtained were dried and jet milled. After jet milling, each of the samples was tested using a screen burst dispersibility test, a blown film test, and a high load test.

The screen burst dispersibility test utilized a ¾ inch extruder equipped with a blunt tip compression ratio screw, a breaker plate, a rod die having an inside diameter of ⅛ inch, and a pressure gauge mounted ahead of the breaker plate. Before each test, the apparatus was purged with low density polyethylene until clean. After cleaning, a 100 mesh screen was mounted in front of the breaker plate and die.

In conducting the screen burst dispersibility test for each of the two samples in question, 10 grams of the particular titanium dioxide product material being tested were thoroughly mixed by shaking with 180 grams of low density polyethylene in a one-gallon glass jar. Next, each of the titanium dioxide/low density polyethylene mixtures was run through the testing device at increasing pressures until either (a) the maximum system pressure was achieved or (b) the screen was caused to burst. The pressure at which the screen was caused to burst (or the maximum system pressure in those cases where the screen did not break) was recorded.

In conducting the blown film tests, each of the two $TiO_2$ products was mixed with low density polyethylene such that the pigment concentration of each mixture was about 60% by weight. The mixtures were then run through a BRABENDER extrusion system equipped with a 3:1 compression screw and a blown film die. In each case, the size of the film product was maintained at a diameter of between about 2¼ inches to about 2½ inches and a thickness of about 0.001 inches. Segments from the mid-portions of the resulting blown samples were then cut to yield 6 inch by 8 inch sheets. The sheets were placed over black backgrounds and the number of nibs present in the sheets were counted.

In the high load test, polyethylene mixing torque values were obtained for the heavily milled and lightly milled pigment samples. These mixing torque values serve as indicators of the relative dispersibilities of the pigments in polyethylene resin. Thus, when comparing two pigment samples, the sample having the lower torque value was more readily dispersible in the polyethylene resin than was the sample having the higher torque value.

In each application of the high load test, 62.80 grams of the pigment material being tested was mixed with 41.79 grams of polyethylene and 0.26 grams of zinc stearate powder in an electrically heated BRABENDER mixer. The ingredients were mixed at 100° C. for 6 minutes at 150 rpm. In each case, the mixing torque being exerted by the mixer at the end of the mixing period was recorded.

The results of the screen burst dispersibility test, the blown film test, and the high load test are shown in Table I. These tests show that the inventive pigmentary product (i.e., the pigment product which was lightly milled and included no added alumina) was much more readily dispersible in polyethylene than was the pigmentary material produced in accordance with the method of the prior art. Specifically, the tests show that (1) the inventive material exhibited a much lower degree of screen blinding, (2) the inventive material produced fewer nibs, and (3) the inventive material exhibited a reduced mixing torque.

TABLE I

| Titanium Dioxide Sample | Screen Burst Test (psi) | Blown Film Test (Nibs) | High Load Test Torque (m-g) |
|---|---|---|---|
| Lightly Milled With No Alumina Added | 1738 | 46 | 1531 |
| Heavily Milled With Alumina Added | 3209 | 52 | 1546 |

In addition to the pigment samples prepared as described hereinabove, a portion of the well milled sample was acidified, digested, and neutralized in the same manner as the lightly milled sample. However, when thus treated, the well milled sample failed to flocculate sufficiently to provide an acceptable filter cake for processing.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

We claim:

1. A method of producing a titanium dioxide product comprising the steps of:
   (a) forming a mixture comprising a titanium dioxide material in a liquid medium, said titanium dioxide material being an agglomerated titanium dioxide material which has been produced by a reaction process and wherein, other than any inorganic oxides formed in said reaction process along with said titanium dioxide material, substantially no inorganic oxides have been deposited on said titanium dioxide material;
   (b) wet milling said agglomerated titanium dioxide material in said liquid medium;
   (c) after step (b), reducing the pH of said mixture to a value not exceeding 4.0;
   (d) after step (c), adding an effective amount of a base to said mixture to cause said titanium dioxide material to flocculate;
   (e) after step (d), removing said titanium dioxide material from said mixture; and
   (f) after step (d), washing said titanium dioxide material,
   wherein, other than any redeposited inorganic oxides originally formed in said reaction process along with said titanium dioxide material, substantially no inorganic oxides are deposited during said method on said titanium dioxide material.

2. The method of claim 1 wherein said agglomerated titanium dioxide material used in step (a) comprises titanium dioxide and wherein said agglomerated titanium dioxide material further comprises an amount of alumina in the range of from about 0.05 parts to about 10 parts by weight per 100 parts by weight of said titanium dioxide present in said agglomerated titanium dioxide material.

3. The method of claim 2 wherein said amount of alumina is an amount in the range of from about 0.25 parts to about 3 parts by weight per 100 parts by weight of said titanium dioxide present in said agglomerated titanium dioxide material.

4. The method of claim 1 wherein said titanium dioxide material is a pigmentary titanium dioxide material.

5. The method of claim 1 wherein said reaction process was a vapor phase oxidation process wherein said agglomerated titanium dioxide material was produced by oxidizing titanium tetrachloride.

6. The method of claim 1 wherein said titanium dioxide material is wet milled in step (b) such that at least 30% by weight but no more than 70% by weight of said wet milled titanium dioxide material has a particle size smaller than 0.5 micron.

7. The method of claim 1 wherein the pH of said mixture is reduced in step (c) by adding sulfuric acid to said mixture.

8. The method of claim 1 wherein, in step (d), a sufficient amount of said base is added to said mixture to adjust the pH of said mixture to a value in the range of from about 5 to about 8.

9. The method of claim 1 wherein said base is sodium hydroxide, potassium hydroxide, or a combination thereof.

10. A titanium dioxide product produced by the method of claim 1.

11. A titanium dioxide product produced by the method of claim 4.

12. A method of producing a titanium dioxide product comprising the steps of:
   (a) forming a mixture comprising a titanium dioxide material in an aqueous medium, wherein said titanium dioxide material comprises titanium dioxide, said titanium dioxide material further comprises an amount of alumina in the range of from about 0.05 parts to about 10 parts by weight per 100 parts by weight of said titanium dioxide present in said titanium dioxide material, said titanium dioxide material is an agglomerated, pigmentary titanium dioxide material which has been produced from titanium tetrachloride using a vapor phase oxidation process, said alumina was formed along with said titanium dioxide in said vapor phase oxidation process, and, other than said alumina and any other inorganic oxides formed in said vapor phase oxidation process along with said titanium dioxide, substantially no inorganic oxides have been deposited on said titanium dioxide material;
   (b) wet milling said agglomerated, pigmentary titanium dioxide material in said aqueous medium such that at least 30% by weight but no more than 70% by weight of said wet milled titanium dioxide material has a particle size smaller than 0.5 micron;
   (c) after step (b), reducing the pH of said mixture to a value not exceeding 4.0;
   (d) after step (c), increasing the pH of said mixture to a value in the range of from about 5 to about 8 such that said titanium dioxide material flocculates;
   (e) after step (d), removing said titanium dioxide material from said mixture; and
   (f) after step (d), washing said titanium dioxide material,
   wherein, other than any redeposited inorganic oxides originally formed along with said titanium dioxide in said vapor phase oxidation process, substantially no inorganic oxides are deposited during said method on said titanium dioxide material.

13. The method of claim 12 wherein:
   the pH of said mixture is reduced in step (c) by adding sulfuric acid to said mixture and
   the pH of said mixture is increased in step (d) by adding sodium hydroxide, potassium hydroxide, or a combination thereof to said mixture.

14. A titanium dioxide product produced by the method of claim 12.

15. A titanium dioxide product produced by the method of claim 13.

16. A process for producing a plastic product comprising the step of dispersing a titanium dioxide product in a plastic material to form a plastic composition, said titanium dioxide product having been produced by a titanium dioxide production method comprising the steps of:
   (a) forming a mixture comprising a titanium dioxide material in a liquid medium, said titanium dioxide material being an agglomerated titanium dioxide material which has been produced by a reaction process and wherein, other than any inorganic oxides formed in said reaction process along with said titanium dioxide material, substantially no inorganic oxides have been deposited on said titanium dioxide material;

(b) wet milling said agglomerated titanium dioxide material in said liquid medium;

(c) after step (b), reducing the pH of said mixture to a value not exceeding 4.0;

(d) after step (c), adding an effective amount of a base to said mixture to cause said titanium dioxide material to flocculate;

(e) after step (d), removing said titanium dioxide material from said mixture; and (f) after step (d), washing said titanium dioxide material, wherein, other than any redeposited inorganic oxides originally formed in said reaction process along with said titanium dioxide material, substantially no inorganic oxides are deposited during said titanium dioxide production method on said titanium dioxide material.

17. The process of claim 16 further comprising the step of forming a plastic sheet from said plastic composition.

18. The process of claim 16 wherein:

said agglomerated titanium dioxide material used in step (a) comprises titanium dioxide and said agglomerated titanium dioxide material further comprises an amount of alumina in the range of from about 0.05 parts to about 10 parts by weight per 100 parts by weight of said titanium dioxide present in said agglomerated titanium dioxide material;

said agglomerated titanium dioxide material is a pigmentary titanium dioxide material;

said reaction process was a vapor phase oxidation process wherein said titanium dioxide was produced by oxidizing titanium tetrachloride; and said titanium dioxide material is wet milled in step (b) such that at least 30% by weight but no more than 70% by weight of said wet milled titanium dioxide material has a particle size smaller than 0.5 micron.

19. The process of claim 18 further comprising the step of forming a plastic sheet from said plastic composition.

20. The process of claim 18 wherein:

the pH of said mixture is lowered in step (b) by adding sulfuric acid to said mixture and said base is sodium hydroxide, potassium hydroxide, or a combination thereof.

21. The process of claim 20 further comprising the step of forming a plastic sheet from said plastic composition.

22. A plastic product produced by the process of claim 16.

23. A plastic product produced by the process of claim 17.

24. A plastic product produced by the process of claim 18.

25. A plastic product produced by the process of claim 19.

26. A plastic product produced by the process of claim 20.

27. A plastic product produced by the process of claim 21.

* * * * *

UNITED STATES PATENT AND TRADEMARK OFFICE
CERTIFICATE OF CORRECTION

PATENT NO. : 5,332,433
DATED : July 26, 1994
INVENTOR(S) : Story, et al.

It is certified that error appears in the above-indentified patent and that said Letters Patent is hereby corrected as shown below:

Col. 9, line 35, change "(d)" to "(e);"

Col. 10, line 44, change "(d)" to "(e);"

Col. 11, line 19, change "(d)" to "(e);"

Col. 12, line 16, change "(b)" to "(c)."

Signed and Sealed this

Thirteenth Day of June, 1995

Attest:

BRUCE LEHMAN

Attesting Officer    Commissioner of Patents and Trademarks